Jan. 13, 1970         L. W. GIBNEY         3,488,808
APPARATUS FOR MAKING SPECTACLE TEMPLE BLANKS
Original Filed Dec. 7, 1964         3 Sheets-Sheet 1
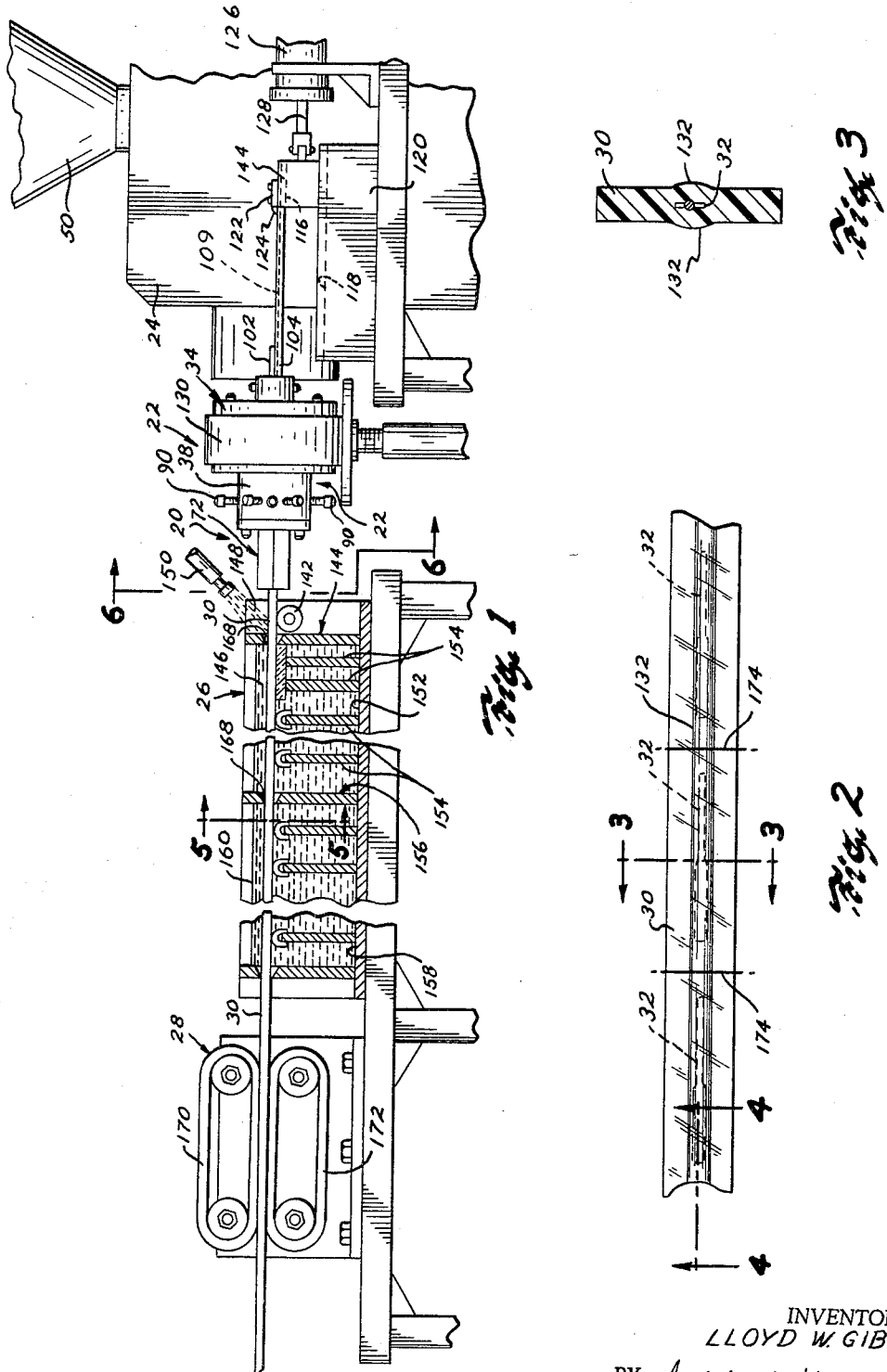
INVENTOR.
LLOYD W. GIBNEY
BY *J. Albert Valiquist*
ATTORNEY

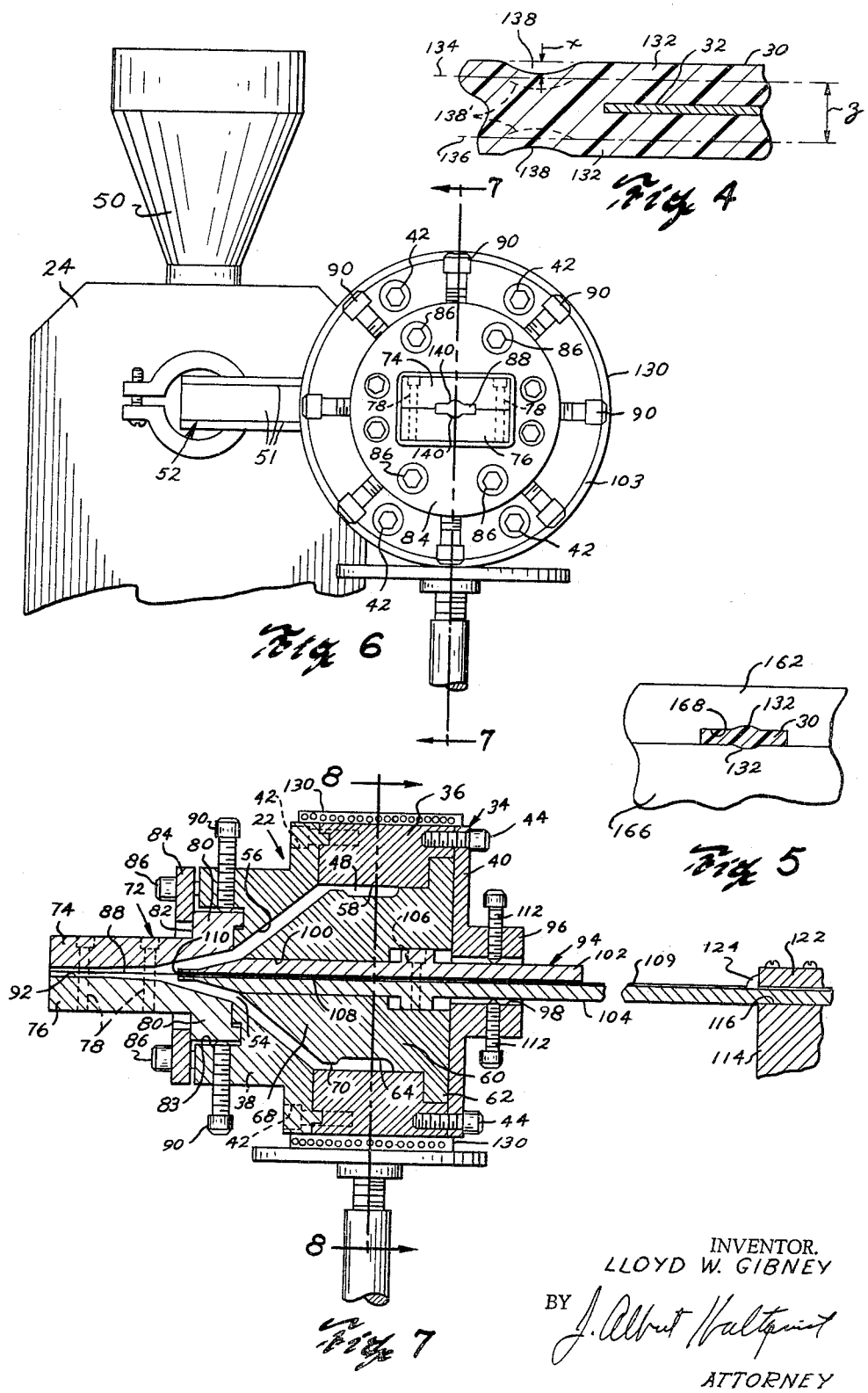

Jan. 13, 1970          L. W. GIBNEY          3,488,808
APPARATUS FOR MAKING SPECTACLE TEMPLE BLANKS
Original Filed Dec. 7, 1964          3 Sheets-Sheet 3
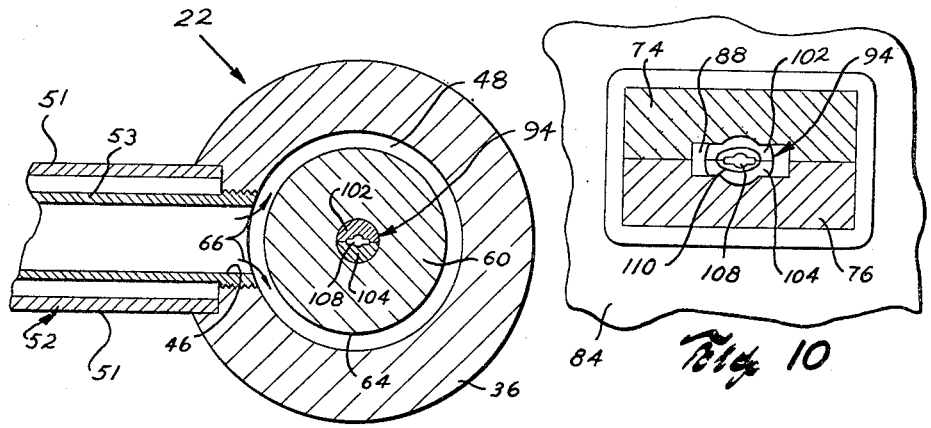
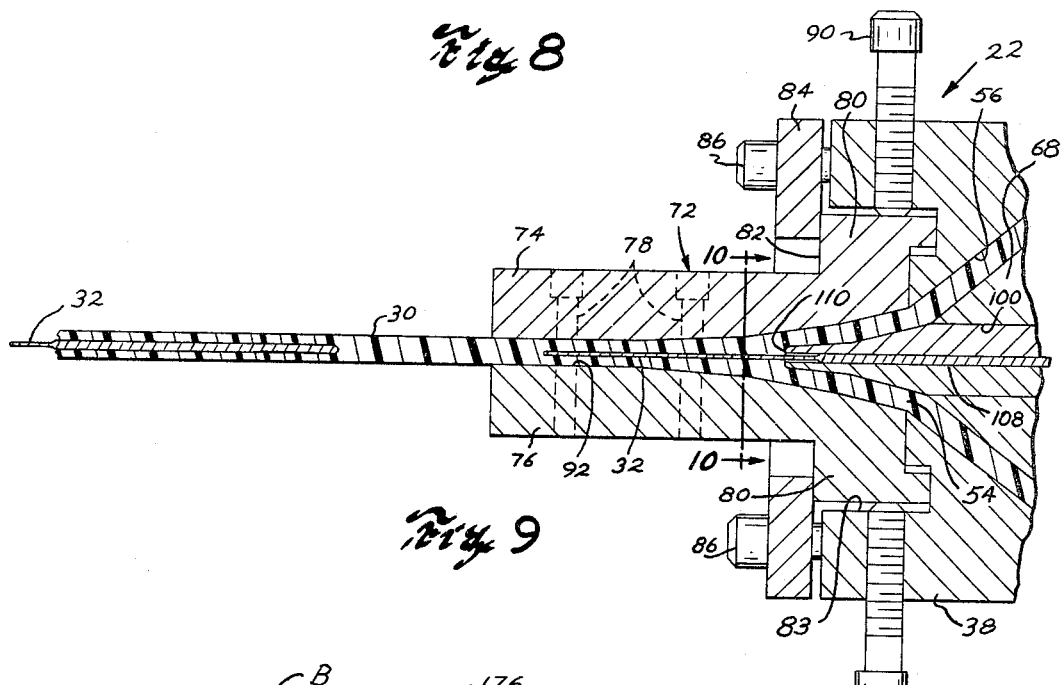
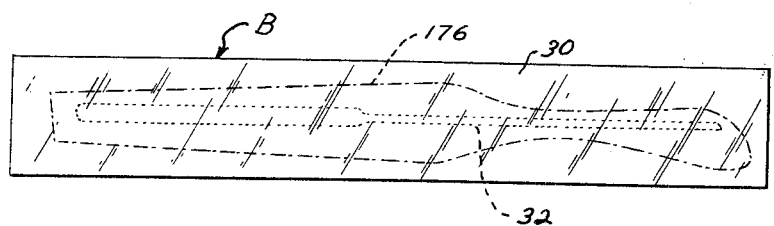
INVENTOR.
LLOYD W. GIBNEY
BY *J. Albert Hultquist*
ATTORNEY

United States Patent Office 3,488,808
Patented Jan. 13, 1970

3,488,808
APPARATUS FOR MAKING SPECTACLE TEMPLE BLANKS
Lloyd W. Gibney, Funkstown, Md., assignor, by mesne assignments, to American Optical Corporation, a corporation of Delaware
Original application Dec. 7, 1964, Ser. No. 416,247, now Patent No. 3,303,566. Divided and this application Mar. 6, 1968, Ser. No. 711,080
Int. Cl. B29f 3/10
U.S. Cl. 18—13                       1 Claim

ABSTRACT OF THE DISCLOSURE

Apparatus for making reinforced plastic blanks for spectacle temples including an extrusion die having an internally disposed conical spreader for directing plastic material uniformly through an extrusion orifice at substantially zero pressure in the orifice by Venturi effect. Elongated die lips receive the plastic material from the extrusion orifice wherein it is formed to a predetermined cross-sectional size and shape. Core guide means extended longitudinally through the spreader into the extrusion orifice completes the configuration of the pressure reducing end of the spreader and serves as means through which reinforcing wires are introduced intermittently into the shaped plastic extrusion as core parts of temples subsequently formed of the extrusion.

---

This is a division of application Ser. No. 416,247, filed Dec. 7, 1964, Patent No. 3,303,566.

BACKGROUND OF THE INVENTION

Field of the invention

Apparatus for making reinforced plastic blanks from which spectacle temples are formed.

Description of the prior art

Hertofore, metal core reinforced plastic temple blanks were formed by lamination or core driving techniques. Lamination, in addition to being a tedious process requiring costly hand operations, the use of messy solvents and relatively long curing times is, at best, subject to a high scrap yield due to the unavoidable entrapment of air bubbles in the lamination and the frequency of unsatisfactory bonds between the plastic and metal laminae. Core driving, on the other hand, requires costly equipment. Furthermore, it has an attendant scrap problem resulting from entrainment of air along the driven core, the introduction of stresses and strain in the plastic which cause frequent chipping, cracking and separation between the plastic and metallic materials and problems in so driving the core that it invariably occupies its intended position within the blank. Many such defects do not become apparent until milling, slotting, hinging, bending and other finishing operations are subsequently performed upon the temple blanks and in such cases the loss due to scrap is consequently much higher.

An object of this invention is to provide for the manufacture of metal core reinforced plastic spectacle temple blanks of improved quality with a substantial savings over current cost. As a corollary of this, it is a further object of the invention to minimize scrap losses in metal reinforced temple blank manufacturing operations by substantially eliminating stresses and strain. the generation of air bubbles and related defects in the blanks.

Another object is to increase the production yield of metal reinforced plastic temple blanks by providing for the achievement of precision tolerances in placement of core members in the blanks.

Still another object is to provide a novel, significantly simple and economical apparatus for mass producing metal reinforced temple blanks of improved product quality.

SUMMARY OF THE INVENTION

To attain the aforesaid objects and others which may appear from the following description in accordance with principles of this invention, spectacle temple blanks are formed by a unique plastic extrusion process during which the metallic cores are inserted into the plastic. A continuous ribbon of plastic material is extruded to the relatively large cross-sectional shape and size required of the blanks. During extrusion of the ribbon a number of temple cores are inserted one after another in spaced end-to-end relationship longitudinally into the ribbon to form a continuous interconnected succession of the reinforced blanks. Thereafter, the ribbon can be several between adjacent ends of the cores to separate the blanks one from another for temple blanking as individual pieces. Alternatively, the temples can be blanked directly from the ribbon.

The present invention will be more fully understood by reference to the following detailed description and the accompanying drawing.

DESCRIPTION OF THE DRAWING

FIG. 1 illustrates, in fragmetary side elevation and partially in section, an embodiment of apparatus used in the manufacture of metal core reinforced plastic temple blanks according to principles of the invention;

FIG. 2 is a fragmentary plan view of an extruded continuous succession of the temple blanks;

FIG. 3 is an enlarged cross-sectional view taken along line 3—3 of FIG. 2;

FIG. 4 is a greatly enlarged fragmentary cross-sectional view taken along line 4—4 of FIG. 2;

FIG. 5 is a fragmentary cross-sectional view taken on line 5—5 of the apparatus shown in FIG. 1;

FIG. 6 is a face view of a portion of the apparatus taken on line 6—6 of FIG. 1;

FIG. 7 is a longitudinal cross-sectional view taken along line 7—7 of FIG. 6;

FIG. 8 is a transverse cross-section taken along line 8—8 of FIG. 7;

FIG. 9 is an enlarged sectional view of a portion of FIG. 7 in operation showing the plastic and cores being extruded;

FIG. 10 is a cross-sectional view taken on line 10—10 of FIG. 9; and

In FIG. 11 there is illustrated a metal core reinforced temple blank wherein the outline of a central portion of the blank intended to be subsequently finished and utilized as a spectacle temple is shown by a dot-dash line.

DESCRIPTION OF THE PREFERRED EMBODIMENTS

FIG. 1 shows system 20, comprising core insertion plastic extrusion die 22, extruder 24 for supplying heat softened flowable plastic material to die 22, water cooling and size control section 26 constructed and arranged to receive extruded plastic from die 22 and belt puller 28 by means of which the extruded plastic from die 22 is drawn through section 26 at a uniform predetermined rate.

According to principles of the invention, metal core reinforced plastic temple blanks are formed by extruding through die 22 a continuous ribbon 30 (FIGS. 1–4) of plastic material supplied to die 22 by extruder 24. Ribbon 30 is shaped by die 22 to substantially the cross-sectional configuration required of the temple blanks. During extrusion of ribbon 30, metal temple cores 32 are inserted longitudinally into the plastic in spaced end-to-end relationship with each other as the plastic is being formed to its final ribbon size and shape within die 22.

Referring more particularly to details of the core insertion at the extrusion apparatus of system 20, it will be seen from FIGS. 6–9 that die 22 comprises head 34 having annular main body member 36, body cap 38 and plate 40. Cap 38 and plate 40 are secured to opposite ends of body member 36 by screws 42 and 44 respectively. Die 22 is provided with inlet orifice 46 extending laterally into body member 36 (FIG. 8) through which heat softened plastic material is fed from extruder 24 into cavity 48 (FIGS. 7 and 8).

Extruder 24, having hopper 50 for receiving plastic material in granulated or pellet form to be heat softened and supplied to die 22, is of conventional design and, accordingly, details thereof are not shown or described herein. Extruder 24 is selected from the various types available to the trade according to the output capacity required thereof to fulfill demands of the system herein being described. Data regarding output capacity and other information needed to select a suitable extruder is provided by suppliers thereof. As an example only, a 1½ inch cellulosic screw type extruder operated at a screw speed of approximately 21 r.p.m. can be used to extrude a continuous ⅞ inch by ⅛ inch ribbon of cellulose acetate or cellulose butyrate plastic through die 22 at an output rate of approximately 10 feet per minute.

Extruder 24 is provided with adaptor 52 at its output end (see FIGS. 6 and 8) through which the plastic material is fed into cavity 48 of die 22. Conduit 53 within adaptor 52 is threaded or otherwise fitted into inlet orifice 46 and carries the plastic material from extruder 24 to die 22. In order to prevent cooling of the plastic material during its transit from extruder 24 to die 22, conventional electrical heating coils (not shown) may be placed around or adjacent to conduit 53 within outer walls 51 of adaptor 52. Body cap 38 of die head 34 is provided with outlet orifice 54 (FIG. 7) through which the plastic material in cavity 48 is extruded. Inner walls 56 of body cap 38 are conically tapered converging from cylindrical inner walls 58 of body member 36 toward orifice 54 so as to change the flow of plastic material to converge toward and flow through outlet orifice 54. Internally of cavity 48 there is provided spreader 60 having a flanged rearward end 62 fitted snugly in annular body member 36 and held in place by base plate 40. Spreader 60 is provided with neck 64 spaced concentrically inwardly of walls 58 of body member 36. Plastic material entering orifice 46 is spread generally as indicated by arrows 66 in FIG. 8 and thus caused to flow circumferentially about walls 58 and thereafter forwardly toward outlet orifice 54. The mid-section of spreader 60 is provided with rim 70 adjoining neck 64. Rim 70 functions to restrict flow of plastic material from annular cavity 48 until such cavity is entirely filled, thus providing for uniform flow throughout the cavity formed between wall 56 and forward section 68 of spreader 60. Through clearance between rim 70 and walls 58 of body member 36 the plastic material flows over rim 70 forwardly in cavity 48 along walls 56 of body cap 38. The forward section 68 of spreader 60 being conical in shape as shown in FIG. 7 and having substantially the same degree of taper as walls 56 is spaced concentrically inwardly of walls 56 to provide a hollow conical passageway therearound through which the plastic material is directed to outlet orifice 54.

Detachably fastened to the forward end of body cap 38 adjacent orifice 54 is face cap assembly 72. Assembly 72 comprises a pair of separable die lips 74 and 76 secured together as a unit with screws 78 (FIGS. 6 and 7). Die lips 74 and 76 are rectangular in cross-section throughout the major portion of their length and are each provided with a semicircular flange 80 at its respective proximal end. When the die lips are assembled as a unit, flanges 80 provide annular shoulder 82 (FIG. 7). The forward end of body cap 38 is provided with cylindrical recess 83 into which flanges 80 of face cap assembly 72 are entered. Assembly 72 is clamped to end cap 38 by retainer plate 84 adapted to be tightened against shoulder 82 by screws 86 to clamp assembly 72 to body cap 38.

Die lips 74 and 76 are grooved longitudinally along respective facing sides thereof which are clamped together. The grooves cooperate to form throat 88 extending from end-to-end through face cap assembly 72. Adjacent the proximal end of assembly 72, throat 88 is widened to form an entrance opening similar in size and shape to orifice 54 in body cap 38 so as to mate therewith. Recess 83 in body cap 38 is large enough to loosely receive flanges 80 of assembly 72. Assembly 72 may therefore be adjusted laterally for centering throat 88 relative to orifice 54. Adjusting screws 90 are provided in body cap 38 (see FIGS. 6, 7 and 9) by means of which precision adjustment or assembly 72 can be made in any one or all lateral directions when retainer plate 84 is loosened by backing off screws 86.

Adjacent the proximal end of assembly 72, throat 88 is tapered inwardly forwardly a land area 92 of substantial length along which the plastic extrudate, in passing, is shaped to the cross-sectional configuration required of ribbon 30.

As set forth hereinabove, metal temple cores are inserted into plastic ribbon 30 during its extrusion. This is accomplished through an elongated slotted core guide 94 extended longitudinally centrally into die 22 through opening 98 in hub 96 of plate 40 through bore 100 in spreader 60 and partially into throat 88 of face cap assembly 72.

Core guide 94 is comprised of upper and lower half sections 102 and 104 secured together with a number of screws 106, one of which is shown by dotted outline in FIG. 7. Adjoining surfaces of each half section 102 and 104 are grooved longitudinally to form guide slot 108 therebetween (see FIGS. 6, 7 and 10) through which temple cores 32 are guided longitudinaly into throat 88 of face cap assembly 72.

The forward end section of core guide 94 which extends into throat 88 is tapered inwardly and forwardly to form a generally elliptically shaped terminal end 110 through which temple cores are inserted into throat 88. This end section of core guide 94 is so shaped as to produce a decrease in the effective cross-section of the passage around core guide 94 through which plastic material flows in the enlarged proximal end of throat 88. Thus, the decrease in cross-section causes an increase in flow velocity of the plastic material adjacent end 110 of core guide 94 where temple cores 32 are inserted through core guide 94 into the plastic material (see FIG. 10).

Core guide 94 is adjustable longitudinally in bore 100 to permit placement of end 110 thereof at a point of substantially null or zero pressure in throat 88 where there is substantially no tendency for plastic material to feed back through guide slot 108. Such null point is caused by Venturi effect due to the tapered decrease in effective cross-section of the passage through which the plastic material flows in throat aperture 88 between orifice 54 and end 110 of core guide 94. Locking screws in hub 96 of plate 40 are provided to clamp core guide 94 in a fixed position of proper longitudinal adjustment in die 22.

Upper half-section 102 of core guide 94 is terminated adjacent the rearwardly disposed outer end of die 22 (FIG. 7) while lower half section 104 extends beyond the termination of section 102 a distance greater than the length of a core 32 to be inserted into die 22 (see FIG. 1 also). Thus, groove 109 in section 104 which forms the lower half of slot 108 is exposed (see FIG. 7) so as to receive cores 32 one at a time therein. When a core 32 is placed in groove 109 it is moved longitudinally into slot 108 by slide 114 which is shown in FIGS. 1 and 7. Slide 114 is provided with channel 116 in which section 104 is received. Slide 114 is supported in slideway 118 of bed 120 (FIG. 1) along which it is moved toward and away from die 22. Cap 122 on slide 114 is provided with finger 124 depending into groove 109 which functions to engage the rearward end of a temple core 32 placed in groove 109. Upon movement of slide 114 forwardly, a core engaged by finger 124 is advanced into slot 108. A second temple core 32 placed in groove 109 and moved forwardly into slot 108 engages the trailing end of a preceding core thereby causing the preceding core to move into throat 88 of assembly 72.

Hydraulic cylinder 126 having its piston rod 128 coupled to slide 114 is illustrated in FIG. 1 as exemplary conventional means for moving slide 114 toward and away from die 22 at a precontrolled uniform rate.

It has been found that it is possible to minimize and, in fact, substantially eliminate the introduction of strain and stresses in the plastic extrudate of ribbon 30 by inserting temple cores 32 at a linear rate of travel approximately equal to the rate at which ribbon 30 is extruded. Accordingly, cylinder 126 is preferably operated to move slide 114 toward die 22 at that rate. Nevertheless, cylinder 126 may be operated so as to insert temple cores 42 at a lineal speed greater than the rate of extrusion of ribbon 30 if an increase in insertion speed is desired. Since the plastic ribbon is extruded continuously and it is contemplated that temple cores be inserted intermittently thereinto in spaced end-to-end relationship as illustrated in FIGS. 2 and 9, the space between cores 32 in ribbon 30 is determined by the delay between successive forward strokes of clinder 126. The return stroke of cylinder 126 is effected at a speed sufficiently greater than its forward stroke to shorten the delay period between successive forward stroke by an amount required to produce a desired spacing between temple cores 32 in ribbon 30. During the interval of time between each return and forward stroke of cylinder 126, a new temple core 32 is placed in groove 109. This may be done manually or by automatic feed form a hopper or the like.

Die 22 is heated with electrical heating unit 130 of conventional design to maintain the plastic material passing therethrough in a flowable condition for extrusion. At the same time, temple cores 32 in core guide 94 awaiting insertion into the plastic extrudate are heating by conduction of heat from the heat plastic material through spreader 60 and core guide 94. This avoids cooling and the generation of strain and stresses in the plastic along the adjoinment of the dissimilar metal and plastic materials when the cores are inserted into the plastic.

It has been found that the plastic material of ribbon 30, upon emission from die lips 74 and 76, has a tendency to neck down adjacent the ends of cores 32 thereby producing what will be referred to herein as "sink areas" 138. Since sink areas 138 (FIG. 4) occur only in the central portion of opposite faces of ribbon 30 adjacent the ends of cores 32 therewithin, a ridge 132 of extruded plastic material (see FIGS. 2, 4 and 5) is formed along each of the uper and lower faces or sides of ribbon 30 during extrusion thereof. Ridges 132 are formed by longitudinal grooves 140 in throat 88 of die lips 74, 76 (FIG. 10). Ridges 132 are comparable in thickness to the anticipated depth $x$ (see FIG. 4) of the plastic sink areas 138 which occur adjacent the ends of cores 32. Thus, in subsequent finishing of the temple blanks, ribbon 30 can be planed or milled to a desired final thickness $z$, for example, as indicated by dot-dash lines 134 and 136 in FIG. 4 to remove sink areas 138. Without ridges 132 sink areas 138 would occcur substantially as indicated by dotted outlines 138' and thus not be completely removed by planing or milling to thickness $z$.

When ribbon 30 leaves die lips 74 and 76 as shown in FIG. 1, it is hot, soft and readily deformable. In order to maintain flatness and size, it is directed over supporting roller 142 through sizing plate 114 into water bath 146. While traversing from die lips 74 and 76 across roller 142, a spray 148 of water from nozzle 150 is directed onto ribbon 30 to retard distortion thereof. Water in spray 148 and in bath 146 is maintained at a temperature low enough to promote partial hardening of ribbon 30 without causing thermal shock and the generation of stresses therein. For a ribbon 30 formed of cellulose acetate or cellulose butyrate extruded at a temperature of approximately 400° Fahreheit, a water temperature of approximately 110° Fahreheit in spray 148 and in bath 146 has been found to produce desirable results. Water bath 146 is contained in tank 152 having a series of bridges 154 over which ribbon 30 is directed through a second sizing plate 156 into tank 158. Tank 158, similar to tank 152, contains water 160 maintained at approximately room temperature or within a temperature range low enough to substantially completely harden the plastic material of ribbon 30 during transit therethrough.

Sizing plates 144 and 156 each comprise upper and lower sections 162 and 166 having aperture 168 therethrough of substantially the same configuration as land area 92 of throat 88. Plates 144 and 156 each function in manner analogous to a drawing die to prevent ribbon 30 from becoming misshapen during its passage from die 22 through section 26.

Upon emerging from tank 158, ribbon 30 is directed through belt puller 28 having double driven belts 170 and 172 between which ribbon 30 is tightly gripped and pulled longitudinally through cooling and size control section 22. Belts 170 and 172 are driven simultaneously by conventional electric motor and mechanical drive means (not shown) at a linear rate equal to the take-off rate desired of the plastic extrudate emerging from die lips 74 and 76 of die 22. The means supporting belts 170 and 172 respectively are adjustable one toward the other so as to provide adequate grip on ribbon 30 for drawing thereof.

Ribbon 30 having cores 32 disposed therewithin as shown in any one of FIGS. 2, 3, 4 or 9 can be severed along lines 174 (FIG. 2) to form individual blanks B, one of which is illustrated in FIG. 11. Individual blanks B or the ribbon 30 itself as a continuous unit can be milled or planed to a finished thickness and blanked to form temples therefrom as shown by the dot-dash outline illustrating the configuration of one such temple 176 in FIG. 11.

It is to be understood that the shape and size of ribbon 30, cores 32 and temple blanks in general which are shown and described herein are illustrative of only one of various configurations capable of being produced according to principles of this invention. Those skilled in the art will readily appreciate that various modifications and adaptations of the precise form of apparatus here shown may be made to suit particular requirements. It is, accordingly, intended that such modifications which incorporate the novel concept disclosed are to be construed as coming within the scope of the claims or the range of equivalency to which they are entitled in view of the prior art.

What is claimed is:

1. In apparatus for forming metal core reinforced plastic blanks for spectacle temples including an extrusion die and means for directing heat softened flowable plastic material continuously into the die, the improvement comprising:

said die having a conically shaped hollow interior converging toward an extrusion orifice adjacent one end thereof;

a stationary conical spreader in said hollow interior coaxially aligned with said orifice for directing said plastic material toward and through said orifice in amounts sufficient to form the main body structure of said temple blanks;

die lips extending from said orifice coaxially away therefrom, said die lips being grooved to form an elongated throat having a conical proximal end and a differently shaped land area of substantial length extending from said conical end to the distal ends of said die lips, said land area being of a cross-sectional shape and size corresponding to that of the main body structure of said blanks extruded therefrom as a continuous ribbon;

a hollow core guide extending coaxially through said spreader into said throat, said core guide being slidably longitudinally adjustable in said spreader and having a conical distal end wherewith the flow velocity and pressure of said plastic material forming said body structure of said blanks in said throat is adjusted by longitudinal movement of said core guide in said spreader to a point where said pressure is reduced by Venturi effect to substantially zero in a zone adjacent said distal end of said core guide;

means for locking said adjusted core guide against displacement in said spreader; and means for intermittently introducing long and slender metal core pieces through said guide means partially into said zone of zero pressure wherein said pieces are further drawn by said flow of plastic material through said throat and die lips substantially centrally therewithin and said plastic material being at substantially zero pressure adjacent said core guide is prevented from flowing thereinto in the absence of core pieces in said zone during intervals between said intermittent introductions thereof.

References Cited

UNITED STATES PATENTS

| | | | |
|---|---|---|---|
| 368,591 | 8/1887 | Jones et al. | 18—13 |
| 862,475 | 8/1907 | Haywood | 18—13 |
| 1,516,968 | 11/1924 | Johnson | 18—13 |
| 1,630,451 | 5/1927 | Ray | 18—13 |
| 1,730,673 | 10/1929 | Mall | 18—13 |
| 2,494,856 | 1/1950 | Aninga et al. | 18—13 |
| 2,561,569 | 7/1951 | Flynn | 18—13 |
| 3,298,063 | 1/1967 | French | 18—13 |
| 441,808 | 12/1890 | Royle et al. | 18—13 |
| 1,422,356 | 7/1922 | Heller | 18—12 |
| 1,726,359 | 8/1929 | Martell et al. | 18—13 |
| 1,859,901 | 5/1932 | Trebes | 18—13 |
| 2,090,404 | 8/1937 | Parkhurst | 18—12 |
| 2,514,211 | 7/1950 | Carlson | 18—12 |
| 3,402,427 | 9/1968 | Christofas et al. | 18—13 |

FOREIGN PATENTS 535,473  1/1957  Canada.

WILLIAM J. STEPHENSON, Primary Examiner